United States Patent

[11] 3,614,511

[72] Inventors Theodore C. Baker
Wayne;
Wolfgang W. Bode, Sylvania; Richard G. Mathias, Toledo; James F. Nolan, Sylvania; Lawrence V. Pfaender, Toledo, all of Ohio

[21] Appl. No. 783
[22] Filed Jan. 5, 1970
[23] Division of Ser. No. 686,384, Nov. 24, 1967, Pat. No. 3,499,167.
[45] Patented Oct. 19, 1971
[73] Assignee Owens-Illinois, Inc.

[54] GAS DISCHARGE DISPLAY MEMORY DEVICE
3 Claims, 6 Drawing Figs.

[52] U.S. Cl. 313/220, 313/188, 313/201, 315/169 TV
[51] Int. Cl. H01j 61/30, H01j 65/04
[50] Field of Search 313/108 B, 109.5, 188, 201, 214, 217, 220; 315/84.6, 169, 169 TV

[56] References Cited

UNITED STATES PATENTS

| | | | |
|---|---|---|---|
| 2,847,615 | 8/1958 | Engelbart | 315/84.6 |
| 3,096,516 | 7/1963 | Pendleton et al. | 315/169 X |

*Primary Examiner*—Roy Lake
*Assistant Examiner*—E. R. La Roche
*Attorneys*—E. J. Holler and Donald K. Wedding

ABSTRACT: A simplified high resolution display and/or memory device having rugged nonconductive support members carrying matrix forming conductor arrays, inorganic dielectric adherent coating or film on the conductor arrays forming a plurality of discrete, but not physically isolated or localized, charge storage surfaces for gaseous discharge generated charges in an ionizable gas at a pressure sufficient to laterally confine charges to selected charge storage areas.

Figure 2:
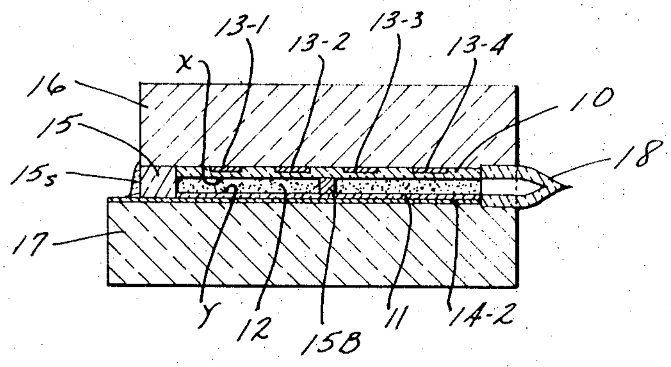

INVENTORS.
THEODORE C. BAKER
WOLFGANG W. BODE
RICHARD G. MATHIAS
JAMES F. NOLAN
LAWRENCE V. PFAENDER
BY
E. J. Holler & Donald K. Wedding
ATTORNEYS INVENTORS.
THEODORE C. BAKER
WOLFGANG W. BODE
RICHARD G. MATHIAS
JAMES F. NOLAN
LAWRENCE V. PFAENDER
BY
E. J. Holler & Donald K. Wedding
ATTORNEYS INVENTORS
THEODORE C. BAKER
WOLFGANG N. BODE
RICHARD G. MATHIAS
JAMES F. NOLAN
LAWRENCE V. PFAENDER E. J. Holler & Donald K. Wedding
ATTORNEYS INVENTORS.
THEODORE C. BAKER
WOLFGANG W. BODE
RICHARD G. MATHIAS
JAMES F. NOLAN
LAWRENCE V. PFAENDER
BY
E. J. Holler & Donald K. Wedding
ATTORNEYS

GAS DISCHARGE DISPLAY MEMORY DEVICE

This case is a divisional application of copending U.S. Pat. Application , Ser. No. 686,384, filed Nov. 24, 1967, now Pat. No. 3,499,167, issued Mar. 3, 1970.

The present invention relates to gaseous discharge display and/or memory devices which have an electrical memory as well as being capable of producing a visual display or representation of data such as numerals, letters, television displays, radar displays, binary words, etc.

Gaseous discharge devices in accordance with the present invention are distinguished from prior discharge devices using internal electrodes in that the dielectric layers prevent any conduction current from actually passing therethrough, the dielectric layers being necessary to serve as collecting surfaces for charges (electrons, ions) during alternate half cycles of the alternating operating potentials, such charges collecting first on one elemental or discrete dielectric surface area and then on an opposing elemental or discrete dielectric surface area on alternate half cycles.

Known gaseous display and/or memory systems, such as the one disclosed in the article entitled "The Plasma Display Panel - A Digitally Addressable Display with Inherent Memory" IEEE Proceeding—Fall Joint Computer Conference—1966 pages 541–547, require physical and/or optical isolation of each individual discharge cell, each such individualized cell being energized by a conductor matrix of orthogonally related conductor arrays. Such isolation is usually provided in the form of a relatively fragile plate or separate center structure having perforations or cells which must be in registry with matrix cross points. An important feature and object of the present invention is to provide a gaseous discharge panel and method in which physical and optical isolation structures for each discharge point is eliminated.

It is known (e.g., "Electrical Breakdown of Argon in Glass Cells with External Electrodes at Constant and at 60–Cycle Alternating Potential"—Journal of Applied Physics Volume 33, No. 4, pages 1,567 et seq., Apr. 1962) that the cross-sectional area of a gas discharge is a function, inter alia, of the pressure of the gas. An object and feature of the present invention is the elimination of the requirement for physical localization of discharges by utilization of this phenomena to provide improvement in image resolution in a multiple discharge gas display device by placing the gas at a pressure sufficient to confine substantially all charges produced by the discharge to a well defined, discrete, elemental cross-sectional area within a large unconfined gas volume. It has been found that as a result of the increase in pressure, the memory margin, as defined herein, improves (approaches unity) as the pressure is increased. However, an upper limit on the gas pressure has not been determined but from a practical point of view appears limited in most cases to the ability of the confining structure to withstand forces caused by pressure differentials between internal pressure and ambient environmental pressures. For example, at high elevations and in aircraft or spacecraft, the forces on the confining structure would appear to be quite large so the supporting structure must be capable of withstanding the resultant stresses without significant deflection or distortion.

While the higher operating gas pressures mean an increase in the magnitude of operating potential such increase is compensated for at least in part by the reduction in potential achieved through use of thin dielectric charge storage material having a low potential drop.

Another problem encountered in known gaseous display-memory devices is the high level of incident radiation required to initiate and maintain normal operation of the panel. A further feature and object of the present invention is the reduction or elimination of the incident or quiescent radiation required to initiate and maintain operation of a gaseous display-memory panel.

Where physical and optical isolation of individual discharges have been deemed necessary in the prior art, relatively complex and difficult manufacturing procedures are necessary in order to insure precise registration of the isolation device (e.g., perforated structure) and each of the matrix conductors. Furthermore, the art recognized that although physically isolated, individualized cells should have relatively free gas passage between all cells so as to assure at least uniform gas pressure throughout the penal and each individual cell because the discharge and memory functions are known to be related to gas pressure. A feature and object of the present invention is the elimination of any requirement for precise registration of electrode assemblies with a perforated isolation member resulting in a simplified rugged display-memory panel.

As a rule, gaseous discharges generate a substantial amount of heat which, when present in integral multiple discharge panels, can affect uniformity of operation of individual discharge area, particularly where selected discharge points are energized more frequently than discharge points in another area of the panel, causing a temperature differential across the panel and possible variation in dimensions of elemental or discrete discharge volumes. Accordingly, a further feature and object of the invention is a multiple gas discharge display-memory panel in which the effect of temperature on the operation of the panel is minimized.

In accordance with the invention, a continuous volume of ionizable gas is confined between a pair of photoemissive dielectric surfaces backed by conductor arrays forming matrix elements. The cross conductor arrays may be orthogonally related (but any other configuration of conductor arrays may be used) to define a plurality of opposed pairs of charge storage areas on the surfaces of the dielectric bounding or confining the gas. Thus, for a conductor matrix having H rows and C columns the number of elemental discharge volumes will be the product H×C and the number of elemental or discrete areas will be twice the number of elemental discharge volumes.

The gas volume is one which produces light and a copious supply of charges (ions and electrons) during discharge and, preferably, the gas is a mixture of gases at a pressure sufficient to laterally confine charges generated on discharge within elemental or discrete volumes of gas between opposed pairs of elemental or discrete dielectric areas within the perimeter of such areas. A useful gas mixture is neon and a small percentage of nitrogen.

The space between the dielectric surfaces occupies by the gas is such as to permit photons generated on discharge in a selected discrete or elemental volume of gas to pass freely through the gas space and strike surface areas of dielectric remote from the selected discrete volume, the remote dielectric surface areas struck or impacted by photons emitting electrons to thereby condition the other and remote elemental volumes for discharges at a uniform applied potential.

With respect to the memory function the allowable distance between the dielectric surfaces depends, inter alia, on the frequency of the alternating current supply, the distance being larger for lower frequencies. If the spacing is relatively large than there is insufficient time for charges to transfer to or collect on the elemental or discrete dielectric surface areas during a cycle if the frequency is too high. While the prior art does disclose gaseous discharge devices having externally positioned electrodes for initiating a gaseous discharge, sometimes called "electrodeless discharges," such prior art devices utilize frequencies and spacings or discharge volumes and operating pressures such that although discharges are initiated in the gaseous medium, such discharges are ineffective or not utilized for charge generation and storage in the manner of the present invention.

The term "memory margin" is defined as $$M.M.=V_f-_{min}$$

where $V_f$ is the magnitude of the applied voltage at which a discharge is initiated in a discrete conditioned (as explained hereinafter) volume of gas defined by common areas of overlapping conductors and $V_s$ is the magnitude of the minimum applied periodic alternating voltage sufficient to sustain discharges once initiated. It will be understood that basic electrical phenomena utilized in this invention is the generation of charges (ions and electrons) alternately storable at pairs of opposed or facing discrete points or areas on a pair of dielectric surfaces backed by conductors connected to a source of operating potential. Such stored charges result in an electrical field opposing the field produced by the applied potential that created them and hence operate to terminate ionization in the elemental gas volume between opposed or facing discrete points or areas of dielectric surface. The term "sustain a discharge" means producing a sequence of momentary discharges, one discharge for each half cycle of applied alternating sustaining voltage, once the elemental gas volume has been fired, to maintain alternate storing of charges at pairs of opposed discrete areas on the dielectric surfaces.

Image resolution as used herein relates to the cross section to which each individual gas discharge can be confined or isolated and the number thereof, side by side, that can be isolated within a given area and still be controlled individually. In accordance with the present invention, prior art perforated plates, etc. which provide image resolution by physical confinement or optical barriers are eliminated. Structurally, the basic physical structures defining a discrete discharge area (and the cross-sectional area of elemental or discrete volumes of gas within which a discharge is effected) are the areas of conductor overlap or commonality on opposite conductor arrays, conductor spacing being selected to minimize the effect of fringe fields, e.g., thickness of gas layer and use of thin dielectric films. With these parameters being relatively fixed, the invention utilizes the effect of gas pressure to aid in localizing discharges.

Figure 1:
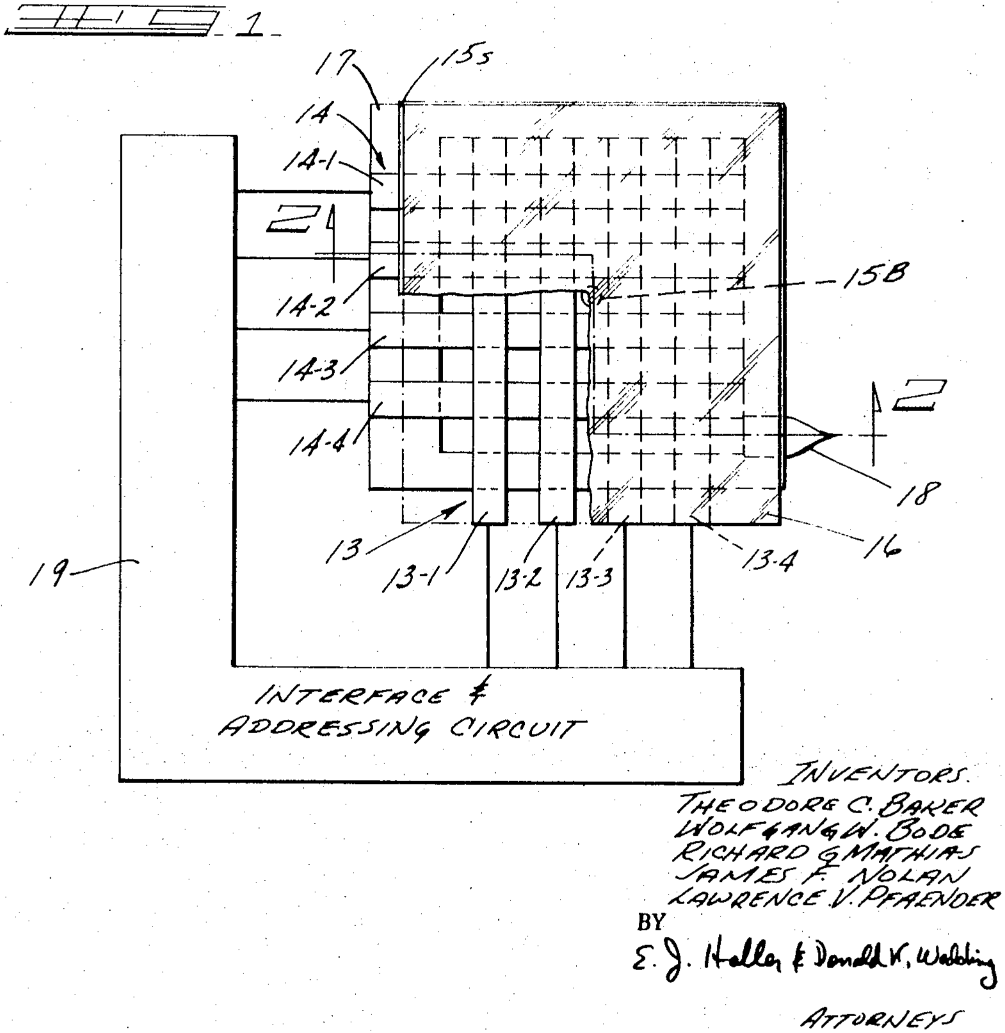
Figure 3:
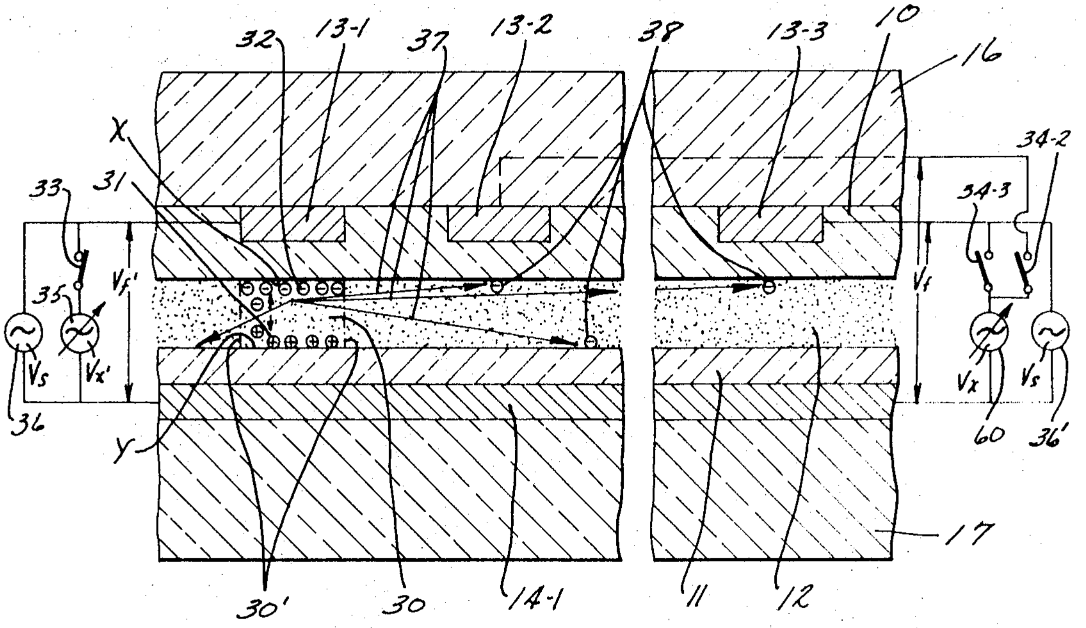
Figure 4:
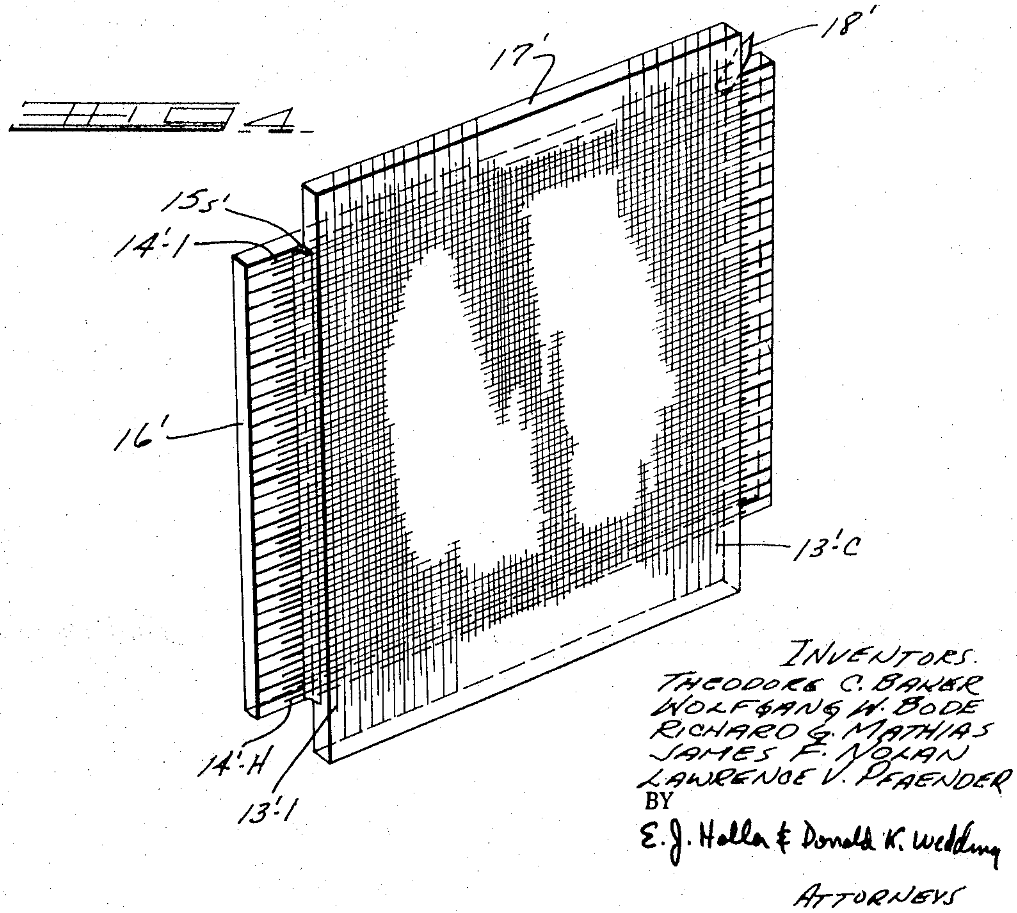
Figure 5:
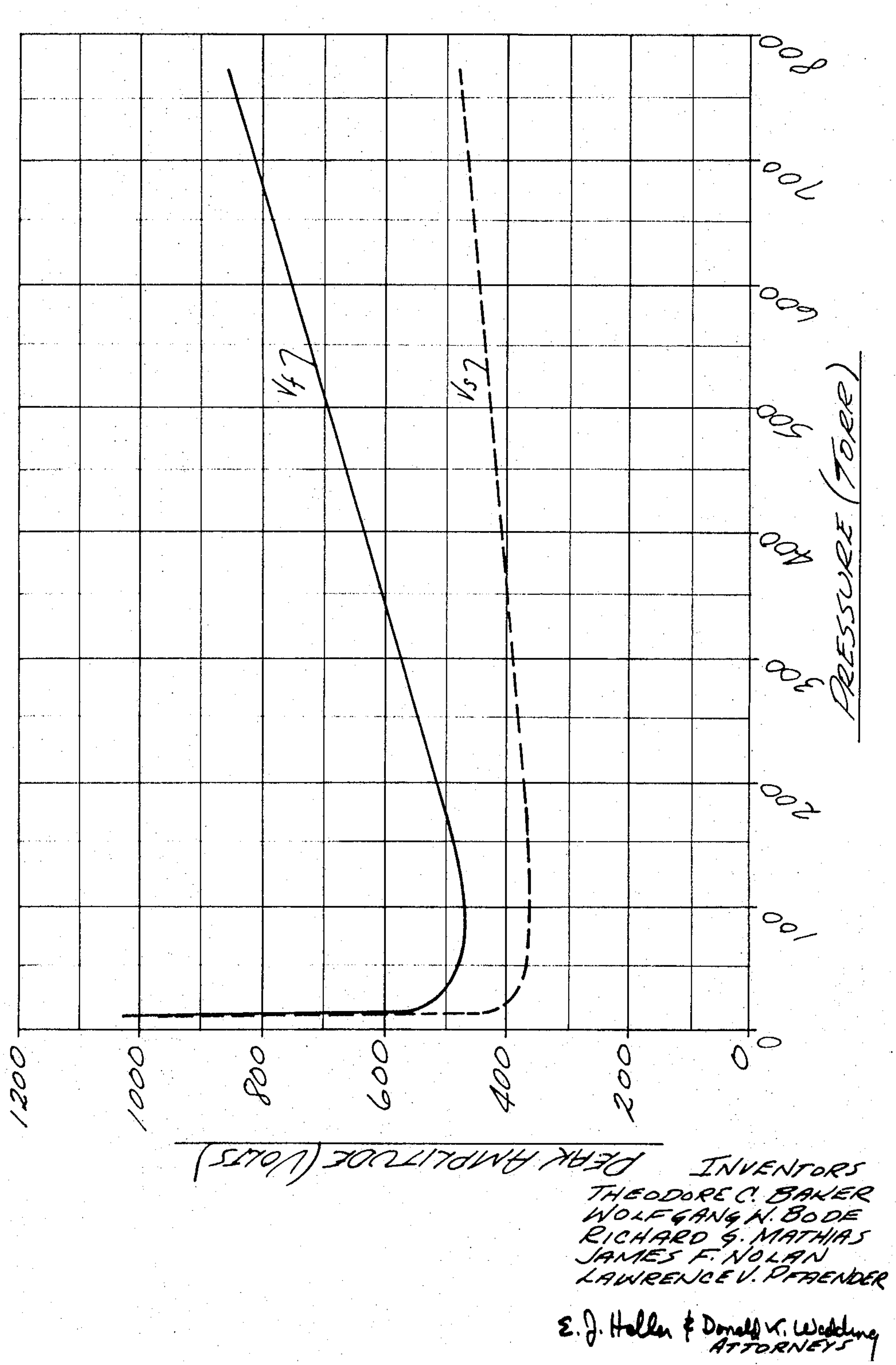
Figure 6:
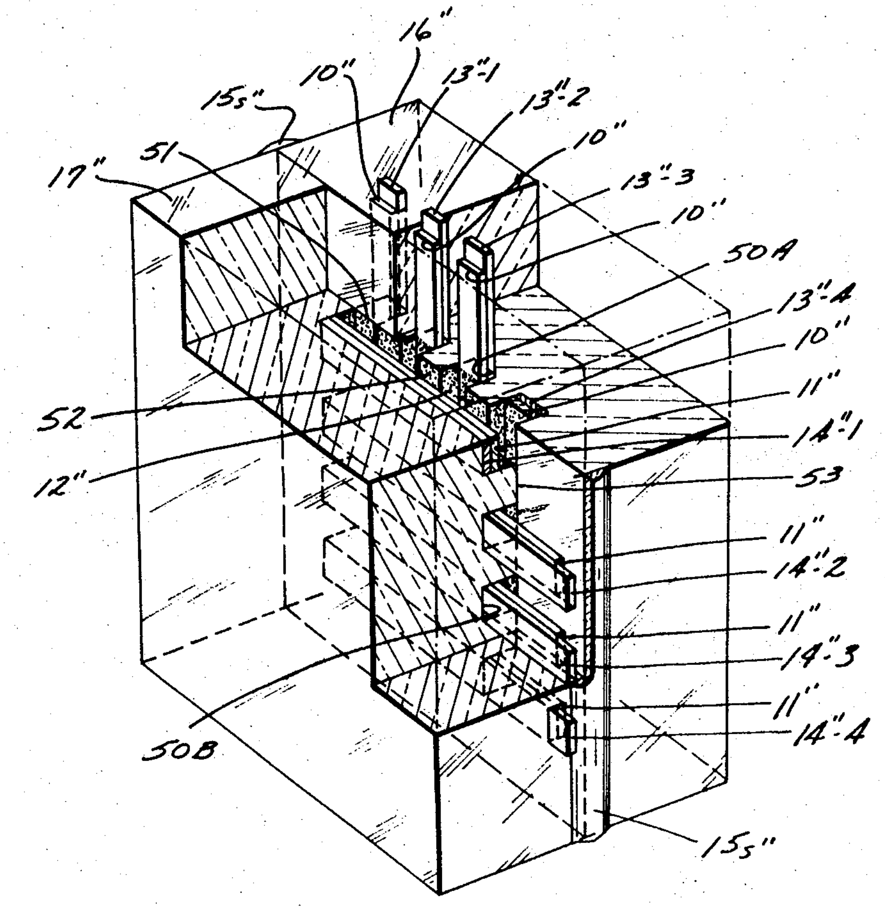

The above, as well as other objects, features and advantages of the invention will become apparent and better understood by reference to the following detailed description when considered in connection with the accompanying drawings wherein:

FIG. 1 is a partially cutaway plan view of a gaseous discharge display - memory panel embodying the invention as connected to a diagrammatically illustrated source of operating potentials, FIG. 2 is a cross-sectional view (enlarged, but not to proportional scale since the thickness of the gas volume, dielectric members and conductor arrays have been enlarged for purposes of illustration) taken on lines 2—2 of FIG. 1, FIG. 3 is an explanatory partial cross-sectional view similar to FIG. 2 (enlarged, but not to proportional scale), FIG. 4 is an isometric view of a larger gaseous discharge display - memory panel incorporating the invention, FIG. 5 is a voltage versus pressure plot illustrating the effect of pressure on improving the memory margin, and FIG. 6 is an isometric cross-sectional view (enlarged but not to proportional scale) of a modified form of a gas discharge display - memory panel embodying the invention.

The invention utilizes a pair of dielectric films or coatings 10 and 11 separated by a thin layer or volume of a gaseous discharge medium 12, said medium 12 producing a copious supply of charges (ions and electrons) which are alternately collectable on the surfaces of the dielectric members at opposed or facing elemental or discrete areas X and Y defined by the conductor matrix on nongas-contacting sides of the dielectric members, each dielectric member presenting large open surface areas and a plurality of pairs of elemental X and Y areas. While the electrically operative structural members such as the dielectric members 10 and 11 and conductor matrixes 13 and 14 are all relatively thin (being exaggerated in thickness in the drawings) they are formed on and supported by rigid nonconductive support members 16 and 17 respectively.

Preferably, one or both of nonconductive support members 16 and 17 pass light produced by discharge in the elemental gas volumes. Preferably, they are transparent glass members and these members essentially define the overall thickness and strength of the panel. For example, the thickness of gas layer 12 as determined by spacer 15 is under 10 mils and preferably about 5 to 6 mils, dielectric layers 10 and 11 (over the conductors at the elemental or discrete X and Y areas) is between 1 and 2 mils thick, and conductors 13 and 14 about 8,000 angstroms thick (tin oxide). However, support members 16 and 17 are much thicker (particularly larger panels) so as to provide as much ruggedness as may be desired to compensate for stresses in the panel. Support members 16 and 17 also serve as heat sinks for heat generated by discharges and thus minimize the effect of temperature on operation of the device. If it is desired that only the memory function be utilized, then none of the members need be transparent to light although for purposes described later herein it is preferred that one of the support members and members formed thereon be transparent to or pass ultraviolet radiation.

Except for being nonconductive or good insulators the electrical properties of support members 16 and 17 are not critical. The main function of support members 16 and 17 is to provide mechanical support and strength for the entire panel, particularly with respect to pressure differential acting on the panel and thermal shock. As noted earlier, they should have thermal expansion characteristics substantially matching the thermal expansion characteristics of dielectric layers 10 and 11. Ordinary ¼" commercial grade soda lime plate glasses have been used for this purpose. Other glasses such as low expansion glasses or transparent devitrified glasses can be used provided they can withstand processing and have expansion characteristics substantially matching expansion characteristics of the dielectric coatings 10 and 11. For given pressure differentials and thickness of plates, the stress and deflection of plates may be determined by following standard stress and strain formulas (see R. J. Roark, Formulas for Stress and Strain, McGraw-Hill, 1954).

Spacer 15 may be made of the same glass material as dielectric films 10 and 11 and may be an integral rib formed on one of the dielectric members and fused to the other members to form a bakeable hermetic seal enclosing and confining the ionizable gas volume 12. However, a separate final hermetic seal may be effected by a high strength devitrified glass sealant 15S. Tubulation 13 is provided for exhausting the space between dielectric members 10 and 11 and filling that space with the volume of ionizable gas. For large panels small bead like solder glass spacers such as shown at 15B may be located between conductors intersections and fused to dielectric members 10 and 11 to aid in withstanding stress on the panel and maintain uniformity of thickness of gas volume 12.

Conductor arrays 13 and 14 may be formed on support members 16 and 17 by a number of well known processes, such as photoetching, vacuum deposition, stencil screening, etc. In the panel shown in FIG. 4, the center to center spacing of conductors in the respective conductor arrays is about 30 mils. Transparent or semitransparent conductive material such as tin oxide, gold or aluminum can be used to form the conductor arrays and should have a resistance less than 3,000 ohms per line. It is important to select a conductor material that is not attacked during processing by the dielectric material.

It will be appreciated that conductor arrays 13 and 14 may be wires or filaments of copper, gold, silver or aluminum or any other conductive metal or material. For example 1 mil wire filaments are commercially available and may be used in the invention. However, formed in situ conductor arrays are preferred since they may be more easily and uniformly placed on and adhered to the support plates 16 and 17.

Dielectric layer members 10 and 11 are formed of an inorganic material and are preferably formed in situ as an adherent film or coating which is not chemically or physically effected during bake-out of the panel. One such material is a solder glass such as Kimble SG–68 manufactured by and commercially available from the assignee of the present invention.

This glass has thermal expansion characteristics substantially matching the thermal expansion characteristics of certain soda-lime glasses, and can be used as the dielectric layer when the support members 16 and 17 are soda-lime glass plates. Dielectric layers 10 and 11 must be smooth and have a dielectric strength of about 1,000 v. and be electrically homogeneous on a microscopic scale (e.g., no cracks, bubbles, crystals, dirt, surface films, etc.) In addition, the surfaces of dielectric layers 10 and 11 should be good photoemitters of electrons in a baked out condition. However, a supply of free electrons for conditioning gas 12 for the ionization process may be provided by inclusion of a radioactive material within the glass or gas space. A preferred range of thickness of dielectric layers 10 and 11 overlying the conductor arrays 13 and 14 is between 1 and 2 mils. Of course, for an optical display at least one of dielectric layers 10 and 11 should pass light generated on discharge and be transparent or translucent and, preferably, both layers are optically transparent.

The preferred spacing between surfaces of the dielectric films is about 5 to 6 mils with conductor arrays 13 and 14 having center to center spacing of about 30 mils.

The ends of conductors 14–1 ....14–4 and support member 17 extend beyond the enclosed gas volume 12 and are exposed for the purpose of making electrical connection to interface and addressing circuitry 19. Likewise, the ends of conductors 13–1 .... 13–4 on support member 16 extend beyond the enclosed gas volume 12 and are exposed for the purpose of making electrical connection to interface and addressing circuitry 19.

As in known display systems, the interface and addressing circuitry or system 19 may be relatively inexpensive line scan systems or the somewhat more expensive high speed random access systems. However, it is to be noted that a lower amplitude of operating potentials helps to reduce problems associated with the interface circuitry between the addressing system and the display/memory panel, per se. Thus, by providing a panel having greater uniformity in the discharge characteristics through out the panel, tolerances and operating characteristics of the panel with which the interfacing circuitry cooperate, are made less rigid.

The curve of FIG. 5 illustrates the relationship between gas pressure and firing and sustaining potentials $V_f$ and $V_s$. The memory margin has been defined as the ratio of the difference between firing potential and the sustaining potential ($V_{f-V_s}$), to the sustaining potential ($V_s$). The curves illustrate the improvement in memory margin as gas pressure is increased, at least within the range shown. The curves shown in FIG. 5 were obtained with pressures from about 10 torr to slightly in excess of 760 torr or about one atmosphere. The spacing between dielectric surfaces was about 38 mils, the frequency of applied potential was about 100 kHz. and the gas was a mixture of about 97 percent neon and about 3 percent nitrogen.

The increased gas pressure is also instrumental in localizing the cross-sectional area of the discharge. A further factor involved in improving resolution is the reduction in the thickness of and spacing between the dielectric layers 10 and 11 which reduction minimizes the fringing effect of electric fields between conductors.

In order to demonstrate the effect of gas pressure on localized discharges, a display assembly was constructed where the space between dielectric surfaces was about 10 mils and the gas was a 10:1 neon-nitrogen mixture. The conductors were spaced on 1/16 -inch centers and supplied from a 60 kHz. supply at between 1,000 to 1,500 volts. The individual discharges were well localized and easily resolved by the eye, below about ½ atmospheric gas pressure however spreading of the discharge occurred.

One mode on initiating operation of the panel will be described with reference to FIG. 3, which illustrates the condition of one elemental gas volume 30 having an elemental cross-sectional area and volume which is quite small relative to the entire volume and cross-sectional area of gas 12. The cross-sectional area of volume 30 is defined by the overlapping common elemental areas of the conductor arrays and the volume is equal to the product of the distance between the dielectric surfaces and the elemental area. It is apparent that if the conductor arrays are uniform and linear and are orthogonally (at right angles to each other) related each of elemental areas X and Y will be squares and if conductors of one conductor array are wider than conductors of the other conductor array, said areas will be rectangles. If the conductor arrays are at transverse angles relative to each other, other than 90°, the areas will be diamond-shaped so that the cross-sectional shape of each volume is determined solely in the first instance by the shape of the common area of overlap between conductors in the conductor arrays 13 and 14. The dotted lines 30′ are imaginary lines to show a boundary of one elemental volume about the center of which each elemental discharge takes place. As described earlier herein, it is known that the cross-sectional area of the discharge in a gas is affected by, inter alia, the pressure of the gas, such that, if desired, the discharge may even be constricted to within an area smaller than the area of conductor overlap. By utilization of this phenomena, the light production may be confined or resolved substantially to the area of the elemental cross-sectional area defined by conductor overlap. Moreover, by operating at such pressure charges (ions and electrons) produced on discharge are laterally confined so as to not materially affect operation of adjacent elemental discharge volumes.

In the instant shown in FIG. 3, a conditioning discharge about the center of elemental volume 30 has been initiated by application to conductor 13–1 and conductor 14–1 firing potential $V_x'$ as derived from a source 35 of variable phase (for example) and source 36 of sustaining potential $V_s$ (which may be a sine wave, for example). The potential $V_x'$ is added to the sustaining potential $V_s$ as sustaining potential $V_s$ increases in magnitude to initiate the conditioning discharge about the center of elemental volume 30 shown in FIG. 3. There, the phase of the source 35 of potential $V_x'$ has been adjusted into adding relation to the alternating voltage from the source 36 of sustaining voltage $V_s$ to provide a voltage $V_f'$, when switch 33 has been closed, to conductors 13–1 and 14–1 defining elementary gas volume 30 sufficient (in time and/or magnitude) to produce a light-generating discharge centered about discrete elemental gas volume 30. At the instant shown, since conductor 13–1 is positive, electrons 32 have collected on and are moving to an elemental area of dielectric member 10 substantially corresponding to the area of elemental gas volume 30 and the less mobile positive ions 31 are beginning to collect on the opposed elemental area of dielectric member 11 since it is negative. As these charges build up, they constitute a back voltage opposed to the voltage applied to conductors 13–1 and 14–1 and serve to terminate the discharge in elemental gas volume 30 for the remainder of a half cycle.

During the discharge about the center of elemental gas volume 30, photons are produced which are free to move or pass through gas medium 12, as indicated by arrows 37, to strike or impact remote surface areas of photoemissive dielectric members 10 and 11, causing such remote areas to release electrons 38. Electrons 38, are, in effect, free electrons in gas medium 12 and condition each other discrete elemental gas volume for operation at a lower firing potential $V_f$ which is lower in magnitude than the firing potential $V_f'$ for the initial discharge about the center of elemental volume 30 and this voltage is substantially uniform for each other elemental gas volume.

Thus, elimination of physical obstructions or barriers between discrete elemental volumes, permits photons to travel via the space occupied by the gas medium 12 to impact remote surface areas of dielectric members 10 and 11 and provides a mechanism for supplying free electrons to all elemental gas volumes, thereby conditioning all discrete elemental gas volumes for subsequent discharges, respectively, at a uniform lower applied potential. While in FIG. 3 a single elemental volume 30 is shown, it will be appreciated that an entire row (or column) of elemental gas volumes may be maintained in a "fired" condition during normal operation of the device with the light produced thereby being masked or blocked off from the normal viewing area and not used for display purposes. It can be expected that in some applications there will always be at least one elemental volume in a fired condition and producing light in a panel, and in such applications it is not necessary to provide separate discharge or generation of photons for purposes described earlier.

However, as described earlier, the entire gas volume can be conditioned for operation at uniform firing potentials by use of external or internal radiation so that there will be no need for a separate source of higher potential for initiating an initial discharge. Thus, by radiating the panel with ultraviolet radiation or by inclusion of a radioactive material within the glass materials or gas space, all discharge volumes can be operated at uniform potentials from addressing and interface circuit 19.

Since each discharge is terminated upon a build up or storage of charges at opposed pair of elemental areas, the light produced is likewise terminated. In fact, light production lasts for only a small fraction of a half cycle of applied alternating potential and depending on design parameters, is in the nanosecond range.

After the initial firing or discharge of discrete elemental gas volume 30 by firing potential $V_f'$, switch 33 may be opened so that only the sustaining voltage $V_s$ from source 36 is applied to conductors 13–1 and 14–1. Due to the storage of charges (e.g., the memory) at the opposed elemental areas X and Y, the elemental gas volume 30 will discharge again at or near the peak of negative half cycles of sustaining voltage $V_s$ to again produce a momentary pulse of light. At this time, due to reversal of field direction, electrons 32 will collect on and be stored on elemental surface area Y of dielectric member 11 and positive ions 31 will collect and be stored on elemental surface area X of dielectric member 10. After a few cycles of sustaining voltage $V_s$, the times of discharges become symmetrically located with respect to the waveform of sustaining voltage $V_s$. At remote elemental volumes, as for example, the elemental volumes defined by conductor 14–1 with conductors 13–2 and 13–3, a uniform magnitude or potential $V_x$ from source 60 is selectively added by one or both of switches 34–2 or 34–3 to the sustaining voltage $V_s$, shown as 36', to fire one or both of these elemental discharge volumes. Due to the presence of free electrons produced as a result of the discharge centered about elemental volume 30, each of these remote discrete elemental volumes have been conditioned for operation at uniform firing potential $V_f$.

In order to turn "off" an elemental gas volume (i.e. terminate a sequence of discharge representing the "on" state), the sustaining voltage may be removed. However, since this would also turn off other elemental volumes along a row or column, it is preferred that the volumes be selectively turned off by application to selected on elemental volumes a voltage which can neutralize the charges stored at the pairs of opposed elemental areas.

This can be accomplished in a number of ways, as for example, varying the phase or time position of the potential from source 60 to where that voltage combined with the potential from source 36' falls substantially below the sustaining voltage.

It is apparent that the plates 16–17 need not be flat but may be curved, curvature of facing surfaces of each plate being complementary to each other. While the preferred conductor arrangement is of the crossed grid type as shown herein, it is likewise apparent that where an infinite variety of two dimensional display patterns are not necessary, as where specific standardized visual shapes (e.g., numerals, letters, words, etc.) are to be formed and image resolution is not critical, the conductors may be shaped accordingly.

The device shown in FIG. 4 is a panel having a large number of elemental volumes similar to elemental volume 30 (FIG 3). In this case more room is provided to make electrical connection to the conductor arrays 13' and 14', respectively, by extending the surfaces of support members 16' and 17' beyond seal 15S', alternate conductors being extended on alternate sides. Conductor arrays 13' and 14' as well as support members 16' and 17' are transparent. The dielectric coatings are not shown in FIG. 4 but are likewise transparent so that the panel may be viewed from either side.

In the modification shown in FIG. 6 each support member has formed therein a plurality of fine grooves or channels 50A and 50B and in each groove one conductor of each conductor array 13'' and 14'' is deposited, respectively. Dielectric coating 10'' is deposited on each conductor of conductor array 13'', respectively, and dielectric coating 11'' is deposited on each conductor of conductor array 14''. The depth of grooves or channels 50 is greater then the total thickness of the conductors and dielectric coatings so that the mouth 51 of each groove or channel is open for the length of each groove. The support members 16'' and 17'' are oriented with their respective grooves at right angles to each other with the lands 52 of each groove on support member 16'' contacting the lands 53 of each groove in support member 17''. Thus, the distance between opposed elemental pairs of dielectric surfaces at conductor crossings is maintained uniform, for gas pressures less than ambient or environmental pressures. In order to eliminate or minimize stresses due to pressure differentials, where the gas pressure is greater than ambient or environmental pressures the contacting lands in the support members may be coated with dielectric or other fusible material and bonded to each other. In this embodiment, the gas 12'' under pressure will be continuous along a groove mouth and have a waffle configuration along the groove at each intersection with the conductor bearing channels of the opposite support member. In this case photons can pass freely along the lengths of a pair of channels to impact dielectric coatings along the channels and thereby condition elemental volumes along a pair of crossing channels.

The invention is not to be limited to the exact forms shown in the drawing for obviously many changes may be made, some of which are suggested herein, within the scope of the following claims.

We claim:

1. In a gas discharge, device, in combination,
a pair of grooved support members,
each grooved support member having a conductor in the bottom of each groove, respectively, to constitute conductor arrays,
a thin dielectric charge storage coating on said conductors,
each said groove having a depth which is greater than the thickness of the conductor and dielectric coating thereon,
means sealingly joining said support members, with at least said dielectric surfaces in spaced-apart relation and with said conductor arrays in transverse relationship to define a plurality of opposed discrete charge storage areas on surfaces of said dielectric coatings, respectively,
an ionizable gas medium in said grooves between the surfaces of said dielectric coatings capable of being ionized between selected opposed discrete areas upon application of a varying electrical potential to a pair of conductors defining said opposed discrete areas and produce a supply of charges for depositing on said dielectric surfaces only at said discrete areas,
and means connected to said conductor arrays for applying said varying electrical potential capable of being electrically coupled through said dielectric to said gas medium.

2. The invention as defined in claim 1 wherein the lands between grooves on one plate contact the lands between grooves on the opposing plate.

3. The invention as defined in claim 2 including fusible means between said lands bonding same to each other.